(12) United States Patent
Cable et al.

(10) Patent No.: US 6,206,145 B1
(45) Date of Patent: Mar. 27, 2001

(54) BRAKE APPARATUS FOR A HYDRAULIC ELEVATOR

(75) Inventors: Edward G. Cable, Swanton; Dean L. Jodry, Sylvania, both of OH (US); Richard A. Stewart, Temperance, MI (US)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 09/217,479

(22) Filed: Dec. 21, 1998

(51) Int. Cl.[7] .................................................. B65H 59/10
(52) U.S. Cl. ........................ 188/67; 187/207; 187/272; 188/256 G; 188/250 E; 188/264 B
(58) Field of Search ........................ 188/250 B, 250 G, 188/250 E, 261, 264 A, 264 B, 74, 75, 67; 187/207, 272

(56) References Cited

U.S. PATENT DOCUMENTS

| | | | |
|---|---|---|---|
| 1,356,458 | * 10/1920 | Moody ................................ | 188/67 |
| 3,571,865 | 3/1971 | Johnson . | |
| 3,647,027 | 3/1972 | Jaseph . | |
| 3,762,512 | * 10/1973 | McIntyre .............................. | 188/189 |
| 3,783,976 | 1/1974 | Kerr . | |
| 3,783,983 | 1/1974 | McNally et al. . | |
| 3,995,534 | 12/1976 | Rastetter . | |
| 4,007,815 | 2/1977 | Acre . | |
| 4,306,339 | 12/1981 | Ward . | |
| 4,449,615 | * 5/1984 | Beath et al. ........................ | 188/67 |
| 4,715,456 | * 12/1987 | Poe, Jr. et al. ..................... | 188/67 |
| 4,823,919 | * 4/1989 | Hayatdavoudi ..................... | 188/67 |
| 5,810,119 | * 9/1998 | Koshak ............................... | 187/272 |
| 5,964,320 | * 10/1999 | Kato et al. .......................... | 187/376 |
| 6,039,151 | * 3/2000 | Ringel et al. ....................... | 188/67 |

FOREIGN PATENT DOCUMENTS

WO 97/12829    4/1997 (WO) .

OTHER PUBLICATIONS

Innovation: Jack Arrester, Feb. 1996, Elevator World, pp. 50–52.

* cited by examiner

Primary Examiner—Robert J. Oberleitner
Assistant Examiner—Devon Kramer
(74) Attorney, Agent, or Firm—MacMillan, Sobanski & Todd, LLC

(57) ABSTRACT

A brake apparatus engages and locks a piston of a hydraulic elevator drive carrying an elevator car or a cable pulley. Attached at the upper end of a hydraulic cylinder guiding the piston is a beam on which are pivotally mounted at least two brake arms at pivot points. The brake arms are pivoted by a slidable plunger toward and away from the piston. Each brake are carries a brake lining having a shoulder formed on an inwardly facing surface providing a transition from a piston contact portion to a recessed portion of the surface. The shoulder is positioned in the same generally horizontal plane as the brake arm pivot point for initially engaging the surface of the piston to reduce forces transmitted through the brake arms during engagement and disengagement.

14 Claims, 4 Drawing Sheets

BRAKE APPARATUS FOR A HYDRAULIC ELEVATOR

BACKGROUND OF THE INVENTION

The present invention relates to brake shoes for a brake apparatus utilized to stop a hydraulic elevator. The brake apparatus is provided for the locking of a piston carrying an elevator car or a cable pulley and guided in a hydraulic cylinder. The brake apparatus has a pair of brake arms tiltable by means of a brake drive, one of the brake linings being arranged on each brake arm, which brake linings are moved into engagement with the piston when the arms are rotated to a braking position.

In the International patent application no. PCT/US96/15901 International publication no. WO 97/12829, there is shown a braking device for a hydraulic elevator in which brake arms are provided for enclosing the piston of a hydraulic cylinder. At unauthorized lowering movements of the piston, the brake arms are tilted downward by means of a brake control, where semicircularly shaped brake linings of the brake arms lock around the piston and clamp the same. It is a disadvantage of this known device, that for the inward and outward tilting movement of the brake arms relatively great forces are necessary.

SUMMARY OF THE INVENTION

The present invention concerns a brake apparatus having a pair of opposed brake arms pivotally mounted at respective pivot points adjacent a piston of a hydraulic elevator drive. The brake apparatus also includes a vertically slidable plunger attached to the brake arms for pivoting the brake arms about the pivot points and a beam upon which the brake arms are pivotally mounted, the beam being adapted to be mounted on the upper end of the hydraulic cylinder guiding the piston. A semicircular brake lining is attached to each of the brake arms for engaging the surface of the piston and at least one shoulder is formed on an inwardly facing surface of each of the brake linings providing a transition between a piston contact portion an a recessed portion that does not contact the piston. The shoulder is positioned in the same horizontal plane as the pivot point of the associated brake arm. As the brake arms are pivoted about the pivot points toward the piston, a portion of each of the shoulders initially engages the surface of the piston thereby minimizing forces applied to the pivot points and the piston through the brake arms. At least one oil channeling groove can be provided adjacent the shoulder for carrying off hydraulic oil on the piston to increase the friction between the piston surface and the brake lining.

The brake apparatus according to the present invention solves the problem of avoiding the disadvantages of the known braking devices and provides a braking device with an increased braking effect.

An advantage of the brake apparatus according to the present invention is that reduced starting forces are necessary for the inward and outward tilting motions of the brake arms it the moments of engagement and disengagement respectively.

It is a further advantage that the braking forces are distributed more evenly over the surface of the brake linings. Also, larger frictional forces are achieved between the brake linings and the piston whereby the piston and thus also the elevator car can be stopped with a lower surface pressure.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
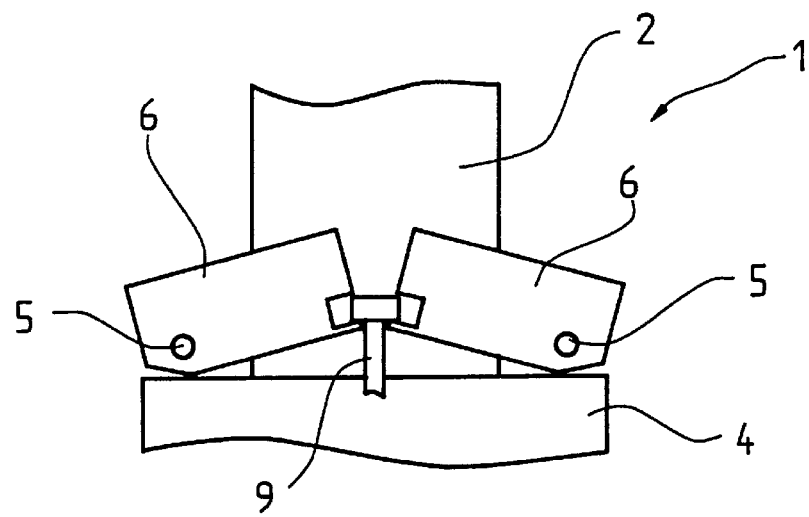
FIG. 1 is a schematic front elevation view of a mechanical brake apparatus in accordance with the present invention acting on a hydraulic elevator piston.

A brake apparatus 1 is shown in the FIG. 1 arranged around a generally cylindrical piston 2 of a hydraulic elevator drive, which apparatus selectively locks the piston that carries an elevator car (not shown) or a cable pulley (not shown). Attached at an upper end of a not illustrated hydraulic cylinder guiding the piston 2, is a beam 4 upon which are pivotally mounted at least two brake arms 6 each tiltable around an axis or pivot point 5. The brake arms 6 are actuated by means of a brake drive, which consists essentially of a brake cylinder 8 (shown in FIG. 2*a*) having a slidable plunger 9 and an electromagnet (not shown) for extending and retracting the plunger.

Figure 2A:
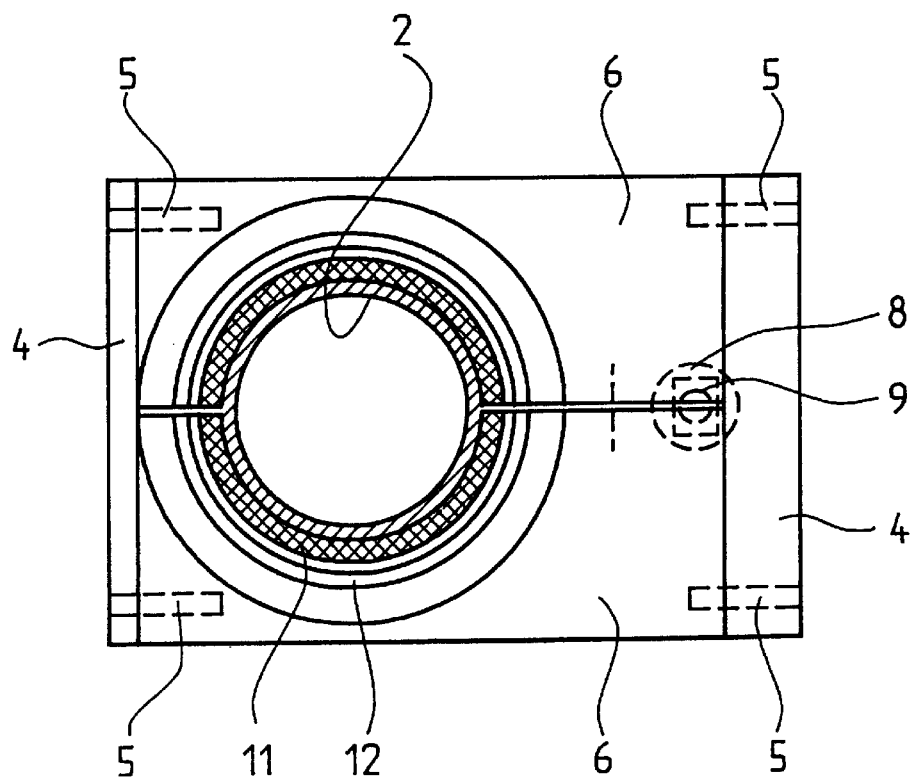
FIG. 2a is top plan view of the brake apparatus shown in the FIG. 1.

As shown in the FIG. 1, the brake arms 6 are pivoted upwardly around the respective axes 5 to a disengaged position. Arranged on each brake arm 6, as shown in FIG. 2*a* for example, is a semicircular brake lining 11 attached to the brake arm by a mounting support 12. In the case where braking is required, the plunger 9 is retracted downwardly to rotate the brake arms 6 downwardly and toward the piston 2 whereby the brake linings 11 frictionally engage around the piston and stop the same from moving in the engaged position shown in the FIGS. 2*a* and 2*b*. The brake lining 11 is formed of a suitable material having a hardness less than the material from which the piston 2 is formed so as to minimize damage to the surface of the piston during braking. A typical brake lining 11 for a brake apparatus having two of the brake arms 6 has a body that can he approximately one quarter inch thick and two to three inches high with a width slightly less than one half the circumference of the piston 2. The body of the brake lining 11 is shaped to correspond to the contour of the surface of the piston 2.

Figure 2B:
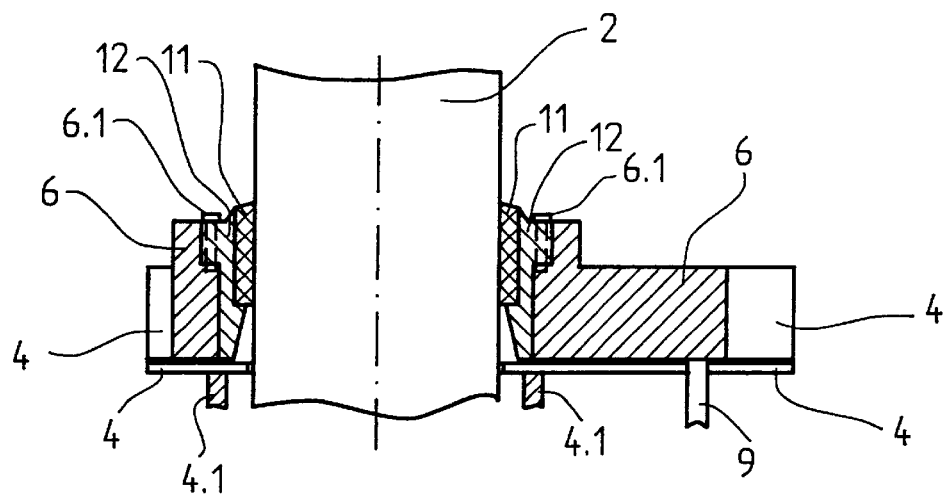
FIG. 2b is a cross-sectional elevation view of the brake apparatus shown in the FIG. 1.

In the FIG. 2b, the mounting support 12 is shown as being connected with the brake arm 6 by means of screws 6.1. The beam 4 carrying the brake arms 6 is supported by means of stays 4.1 oil the upper end of the hydraulic cylinder (not shown).

As shown in the FIGS. 3 through 6, a first embodiment of the brake lining 11 has an inwardly facing surface including a generally horizontally extending, piston surface engaging central contact portion 10. A shoulder 13 is formed at a lower edge of the piston surface contact portion 10 to define a recessed generally horizontally extending lower portion 10a of the inwardly facing surface that will not contact the piston 2. Upon pivoting of the brake arm 6 toward the position shown in the FIG. 2b, the brake lining 11 makes first contact at the center thereof with the shoulder 13 engaging the outer surface of the piston 2. The vertical position of the shoulder 13 at the center of the brake lining 11 is chosen in such a manner that the first point of contact between the shoulder 13 and the surface of the piston 2 lies at about equal height, in the same horizontal plane, as the point of rotation about the axis of rotation 5 of the brake arm 6. This relationship eliminates any over-center condition thus reducing the initial force applied to the piston 2 and the pivot points 5 during pivoting into contact by the brake arms 6. Similarly, the force required to disengage the brake arms 6 from the piston 2 is reduced.

The shoulder 13 extends from the center of the brake lining 11 toward both side edges at a slight upward incline. For equalization of the contact surface between the inner surface central contact portion 10 of the brake lining 11 and the surface of the piston 2, for the precise distribution of the forces on the brake lining, it is also possible to insert sheet-metal shims (not shown) between the brake lining and the support 12. Provided at the center of the brake lining 11 are a pair of vertically aligned conical screw holes 14 to accept countersunk screws (not shown) that attach the brake lining to the support 12.

The brake lining 11 shown ill the FIGS. 3–6 has a second shoulder 13a formed at an upper edge of the central contact portion 10 to define a recessed generally horizontally extending upper portion 10b of the inwardly facing surface that will not contact the piston 2. The distance between the shoulders 13 and 13a can be selected to vary the contact surface area of the central contact portion 10.

Figure 7:
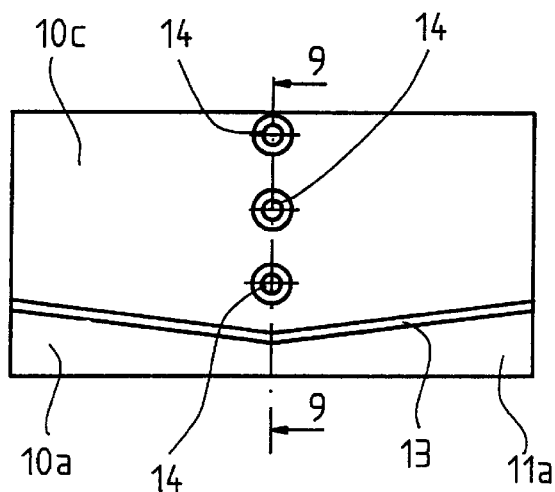
FIG. 7 a projection view of a second embodiment of the brake lining according to the present invention.
Figures 8, 9:
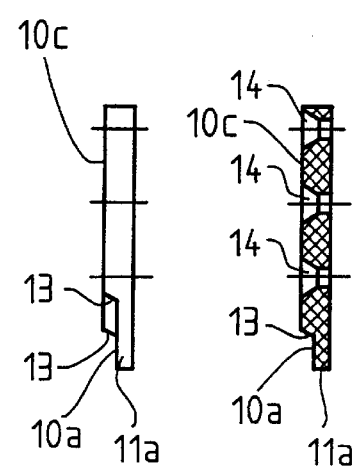
FIG. 8 is an end view of the brake lining shown in the FIG. 7.
FIG. 9 is a cross-sectional view of the brake lining taken along the line 9—9 in the FIG. 7.

There is shown in the FIGS. 7–9 a second embodiment brake lining 11a, having the single shoulder 13 separating the lower recessed portion 10a from a generally horizontally extending, piston engaging tipper contact portion 10c extending to an upper edge of the lining. Three generally vertically aligned screw holes 14 are formed in the upper surface contact portion 10c for attachment to the support 12. When the vertical position of the shoulder 13 is selected to horizontally align with the axis 5 as described above, the contact area of the surface contact portion 10c is maximized.

Figure 10:
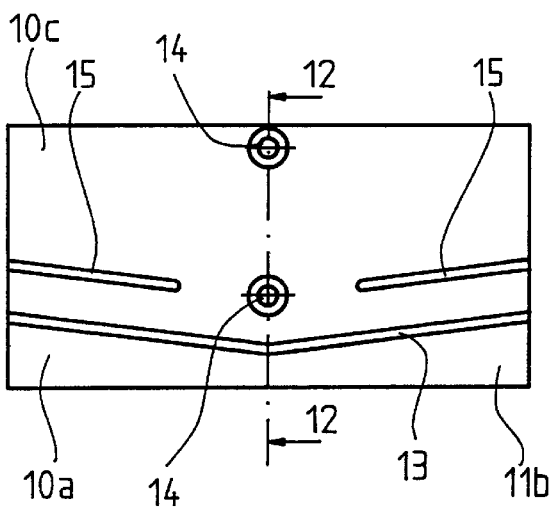
FIG. 10 is a projection view of a third embodiment of the brake lining according to the present invention.
Figures 11, 12:
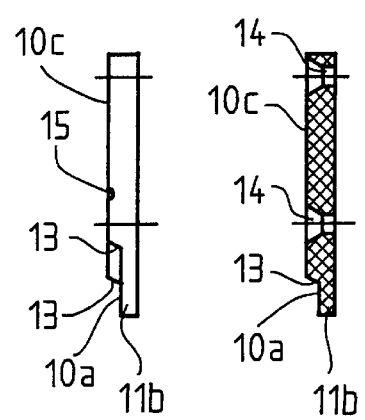
FIG. 11 is an end view of the brake lining shown in the FIG. 10.
FIG. 12 is a cross-sectional view of the brake lining taken along the line 12—12 in the FIG. 10.

There is shown in the FIGS. 10–12 a third embodiment brake lining 11b similar to the brake lining 11a having the single shoulder 13, the lower recessed portion 10a and the upper contact portion 10c with two of the vertically aligned screw holes 14. A pair of inclined grooves 15 are formed in the contact portion 10c extending from the side edges of the brake lining 11b toward the center thereof. The grooves 15 are inclined generally parallel to the shoulder 13 and carry off the hydraulic oils adhering to the surface of the plunger 2. The function of the grooves 15 is to increase the friction between brake lining 11b and the surface of the piston 2, whereby a smaller contact pressure is necessary for the brake linings to hold the piston and the associated elevator car. Although two of the grooves 15 are shown, any number could be used.

Figure 3:
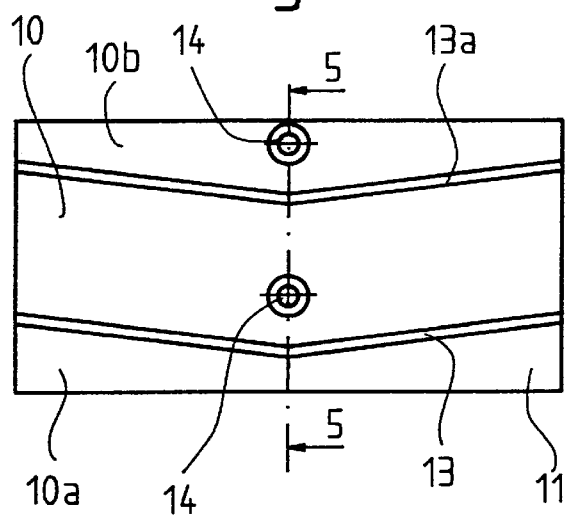
FIG. 3 is a projection view in more detail of a first embodiment of the brake lining shown in the FIGS. 2a and 2b.
Figures 4, 5:
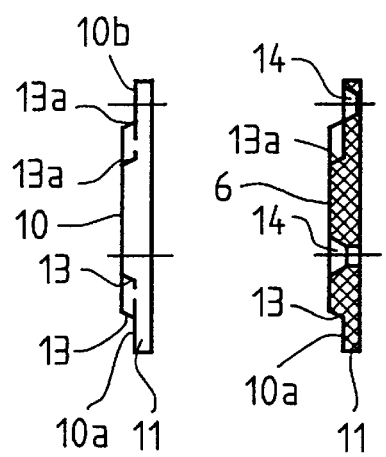
FIG. 4 is all end view of the brake lining shown in the FIG. 3.
FIG. 5 is a cross-sectional view of the brake lining taken along the line 5—5 in the FIG. 3.
Figure 6:
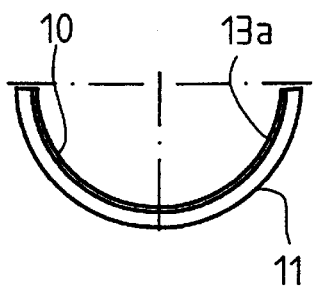
FIG. 6 is a top plan view of the brake lining shown in the FIG. 3 formed for installation on the brake arm.
Figure 13:
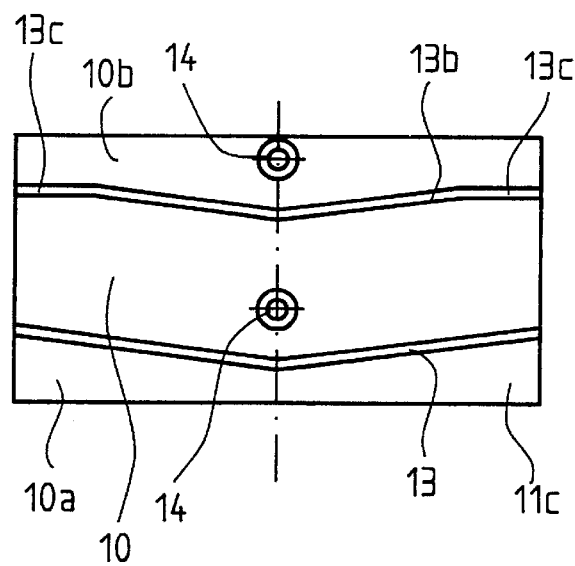
FIG. 13 is a projection view of a fourth embodiment of the brake lining according to the present invention.

There is shown in the FIG. 13 a fourth embodiment brake lining 11c similar to the brake lining 11 shown in the FIG. 3. However, a shoulder 13b, between the contact portion 10 and the upper recessed portion 10b, is modified with a pair of generally horizontally extending end portions 13c extending to the side edges of the brake lining 11c.

Figure 14:
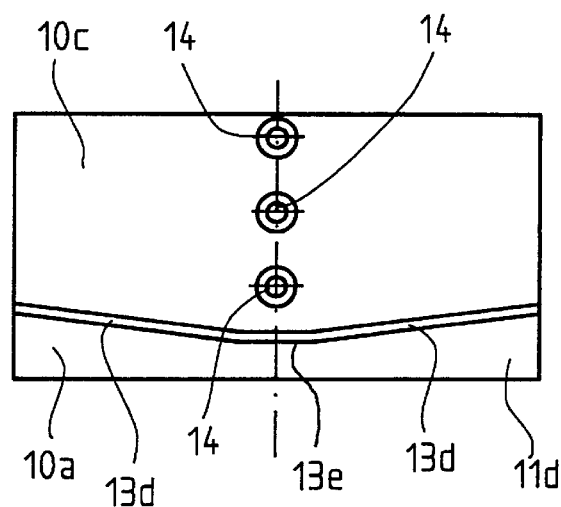
FIG. 14 is a projection view of a fifth embodiment of the brake lining according to the present invention.

There is shown in the FIG. 14 a fifth embodiment brake lining 11d similar to the brake lining 11a shown in the FIG. 7. However, a shoulder 13d, between the contact portion 10c and the lower recessed portion 10a, is modified with a generally horizontally extending center portion 13e extending across the center of the brake lining 11d.

Figure 15:
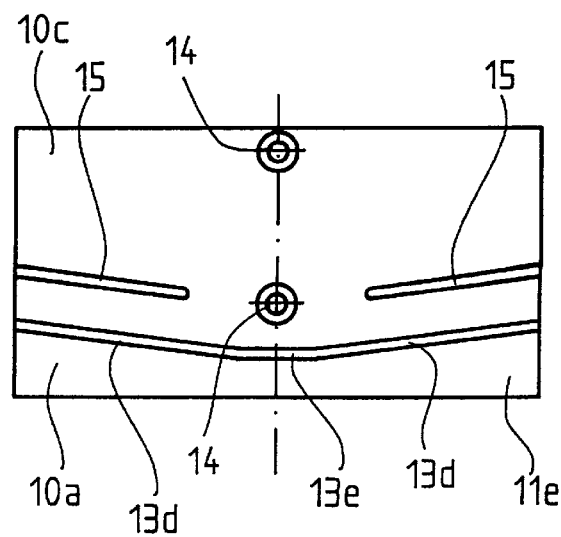
FIG. 15 is a projection view of a sixth embodiment of the brake lining according to the present invention.

There is shown in the FIG. 15 a sixth embodiment brake lining 11e similar to the brake lining 11b shown in the FIG. 10. However, the shoulder 13, between the contact portion 10c and the lower recessed portion 10a, is replaced with the shoulder 13d shown in the FIG. 14 and having the generally horizontally extending center portion 13e extending across the center of the brake lining 11e.

The shoulders and portions thereof, 13 through 13e, are typically formed at a forty-five degree angle to a plane of the piston surface contact portion, but other angles could be used. Based upon testing, the sixth embodiment brake lining 11e provided the best performance. The brake lining 11e tested was formed from a sheet of one quarter inch thick CDA 110 copper material having a height or two inches and a width of nine inches. The horizontal center portion 13e or the shoulder was approximately two inches wide and the grooves 15 were approximately two and one half inches long and one-eighth inch wide. The vertical distance between the end of the shoulder 13d and the center portion 13e was approximately seventeen thirty-seconds of an inch. Two of the brake linings 11e were formed into a semicircular shape and installed on the brake apparatus 1 and utilized to stop the piston 2 having a diameter of approximately six inches.

In summary, the braking apparatus 1 includes the pair of opposed brake arms 6 pivotally amounted at the respective pivot points 5 adjacent the piston 2 of the hydraulic elevator. The brake lining 11, 11a, 11b, 11c, 11d, 11e is attached to each of the brake arms 6 for engaging the surface of the piston 2 and has at least one of the shoulders 13, 13d formed thereon whereby as the brake arms are pivoted about the pivot points toward the piston, a portion of each of the shoulders initially engages the surface of the piston thereby minimizing forces applied to the piston and the pivot points through the brake arms. The brake apparatus 1 includes the vertically slidable plunger 9 attached to the brake arms 6 for pivoting the brake arms about the pivot points 5 and the beam 4 upon which the brake arms are pivotally mounted, the beam being adapted to be mounted on the upper end of the hydraulic cylinder guiding the piston.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A brake lining for use in a brake apparatus for a hydraulic elevator for the locking of a generally cylindrical load carrying piston guided in a hydraulic cylinder, the brake apparatus including a brake arm pivotally mounted at a pivot point adjacent the piston, the brake lining comprising:
   a brake lining body having an inwardly facing surface formed to correspond to a contour of a surface of a generally cylindrical hydraulic elevator piston and a lower edge, said inwardly facing surface including a piston contact surface portion and an adjacent recessed portion extending to said lower edge; and
   at least one shoulder formed in said inwardly facing surface of said brake lining body, said one shoulder providing a transition between said piston surface contact portion of said inwardly facing surface and said recessed portion of said inwardly facing surface;
   whereby when said lining is attached to a brake arm mounted to pivot about a pivot point adjacent the piston and the brake arm is pivoted about the pivot point to move said lower edge toward the piston, said recessed portion clears the surface of the piston and a portion of said shoulder initially engages the surface of the piston thereby minimizing forces applied to the piston and the pivot point through the brake arm.

2. The brake lining according to claim 1 wherein a central portion of said one shoulder at a center of said brake lining body and the pivot point for the brake arm lie in approximately a same horizontal plane and said one shoulder extends from said center of said brake lining body toward opposite side edges thereof at a slight upward incline.

3. The brake lining according to claim 1 wherein said portion of said one shoulder is a generally horizontally extending center portion.

4. The brake lining according to claim 1 wherein said brake lining body has at least one groove formed in said surface contact portion for draining hydraulic oil adhering to the surface of the piston, said groove extending to a side edge of said brake lining body.

5. The brake lining according to claim 4 wherein said groove extends generally parallel to said one shoulder.

6. The brake lining according to claim 1 wherein said one shoulder is formed at an angle of approximately forty-five degrees to a plane of said piston contact portion.

7. The brake lining according to claim 1 wherein said one shoulder is a generally downwardly facing shoulder and said brake lining has another shoulder formed in said inwardly facing surface above said one shoulder, said another shoulder facing generally upwardly and providing a transition between said piston surface contact portion center of said brake lining body and an upper recessed portion of said inwardly facing surface, said another shoulder extending from said center of said brake lining body toward said opposite side edges thereof at a slight upward incline.

8. The brake lining according to claim 7 wherein said another shoulder has a generally horizontally extending end portion adjacent each of said opposite side edges of said brake lining body.

9. A brake apparatus for locking a load carrying piston in a hydraulic elevator comprising:
   at least one brake arm pivotally mounted at a pivot point adjacent a generally cylindrical piston of a hydraulic elevator;
   a brake lining body attached to said brake arm and having an inwardly facing surface for engaging a surface of the piston and a lower edge, said inwardly facing surface including a piston surface contact portion and an adjacent recessed portion extending to said lower edge; and
   a shoulder formed on said brake lining providing a transition between said piston surface contact portion of said inwardly facing surface and said recessed portion of said inwardly facing surface, a central portion of said shoulder being positioned generally in a same horizontal plane with said pivot point;
   whereby as said brake arm is pivoted about said pivot point to move said lower edge toward the piston, said recessed portion clears the surface of the piston and said central portion of said shoulder initially engages the surface of the piston thereby minimizing forces applied to the surface of the piston and the pivot point through said brake arm.

10. The brake apparatus according to claim 9 wherein said central portion of said shoulder extends generally horizontally and a remainder of said shoulder extends to opposite side edges of said brake lining body at a slight upward incline.

11. The brake apparatus according to claim 10 wherein said brake lining body has a pair of grooves formed in said surface contact portion for draining hydraulic oil adhering to the surface of the piston, said grooves extending to said side edges of said brake lining body generally parallel to said remainder of said shoulder.

12. The brake apparatus according to claim 11 wherein said shoulder is formed at an angle of approximately forty-five degrees to a plane of said piston surface contact portion.

13. A brake apparatus for engaging and locking a load carrying piston of a hydraulic elevator comprising:
   a beam mounted at an upper end of a hydraulic cylinder;
   a pair of opposed brake arms pivotally mounted at respective pivot points on said beam adjacent a piston extending from said hydraulic cylinder;
   a brake lining attached to each said brake arm, each said brake lining having a body with an inwardly facing surface shaped for engaging a surface of the piston and a lower edge, said inwardly facing surface including a piston surface contact portion adjacent a recessed portion extending to said lower edge;
   at least one shoulder formed on each said inwardly facing surface providing a transition between said piston surface contact portion of said inwardly facing surface above said shoulder and said recessed portion of said inwardly facing surface below said shoulder, said shoulder having a generally horizontally extending central portion and extending therefrom at a slight upward incline to opposite side edges of said brake lining body, said central portion being positioned in a generally horizontally extending plane with said respective pivot point; and
   at least one oil carrying groove formed in said piston surface contact portion extending to one of said side edges;
   whereby as said brake arms are pivoted about said pivot points to move said lower edges toward the piston, said recessed portions clear the surface of the piston and said central portion of each said shoulder initially engages the surface of the piston thereby minimizing forces applied to the piston surface and said pivot points through said brake arms.

14. The brake apparatus according to claim 13 including a vertically slidable plunger attached to said brake arms for pivoting said brake arms about said pivot points.

* * * * *